US006282181B1

(12) United States Patent
Stark et al.

(10) Patent No.: US 6,282,181 B1
(45) Date of Patent: Aug. 28, 2001

(54) PSEUDORANDOM NUMBER SEQUENCE GENERATION IN RADIOCOMMUNICATION SYSTEMS

(75) Inventors: Wayne Stark, Ann Arbor, MI (US); Gregory E. Bottomley, Cary; Paul W. Dent, Pittsboro, both of NC (US)

(73) Assignee: Ericsson INC, Research Triangle Park, NC (US)

( * ) Notice: Subject to any disclaimer, the term of this patent is extended or adjusted under 35 U.S.C. 154(b) by 0 days.

(21) Appl. No.: 09/065,590

(22) Filed: Apr. 24, 1998

(51) Int. Cl.[7] ................................................. H04B 7/216
(52) U.S. Cl. ......................... 370/335; 370/310; 370/342
(58) Field of Search ..................................... 370/310, 313, 370/335, 431, 441, 447, 209, 210, 212, 213, 515, 342, 130, 140; 375/292, 200; 455/462

(56) References Cited

U.S. PATENT DOCUMENTS

| 3,648,237 | * | 3/1972 | Frey, Jr. et al. ...................... 375/367 |
| 3,875,528 | | 4/1975 | Hirsch .................................... 331/78 |
| 4,571,556 | * | 2/1986 | Gnerlich et al. ......................... 331/78 |
| 4,649,549 | * | 3/1987 | Halpern et al. .......................... 380/32 |
| 5,218,619 | | 6/1993 | Dent ...................................... 370/219 |
| 5,228,054 | | 7/1993 | Rueth .................................... 708/252 |
| 5,331,666 | | 7/1994 | Dent ...................................... 375/341 |
| 5,335,250 | | 8/1994 | Dent et al. ............................ 375/224 |
| 5,438,596 | | 8/1995 | Sugita ................................... 375/140 |
| 5,448,616 | * | 9/1995 | Kaewell, Jr. et al. ..................... 379/5 |
| 5,596,571 | | 1/1997 | Gould et al. .......................... 370/335 |
| 5,910,944 | * | 6/1999 | Callicotte et al. ..................... 370/311 |
| 5,987,056 | * | 11/1999 | Banister ................................ 375/200 |
| 6,026,124 | * | 2/2000 | Lee et al. .............................. 375/292 |
| 6,108,317 | * | 8/2000 | Jones et al. ........................... 370/320 |

FOREIGN PATENT DOCUMENTS

| 0 744 840 A2 | 11/1996 | (EP) . |
| 2 300 473 A | 9/1976 | (FR) . |

OTHER PUBLICATIONS

"A Hybrid Design of Maximum–Length Sequence Generators" L.T. Wang et al. Proceedings of the Annual Expert Systems in Government Conference, Washington, 19–23, Oct., 1987.

"Calculating the effects of linear dependencies in m–sequences used as test stimuli", Bardell, P. H., in International Test Conference 1989 Proceedings. Meeting the Tests of time, (Cat No. 89CH2742-5), Aug. 1989.

\* cited by examiner

Primary Examiner—Hassan Kizou
Assistant Examiner—Saba Tsegaye
(74) Attorney, Agent, or Firm—Coats & Bennett

(57) ABSTRACT

Pseudorandom number sequence generation is a significant component in a variety of existing and proposed CDMA systems. In CDMA handsets, techniques for sequence generation in conjunction with sleep mode are an important component in paging performance and standby time. Techniques are described herein for properly advancing sequence states in conjunction with, for example, sleep mode without detrimentally draining battery capacity.

13 Claims, 7 Drawing Sheets

PSEUDORANDOM NUMBER SEQUENCE GENERATION IN RADIOCOMMUNICATION SYSTEMS

BACKGROUND

The present invention relates generally to radiocommunication systems and, more particularly to techniques for generating and advancing pseudorandom number sequences used in such systems.

Direct-sequence code division multiple access (DS-CDMA) is a method of communication whereby each user transmits information in a given frequency band simultaneously. Different users modulate each data bit using a unique pseudo-random spreading code. At the receiver different users' signals are separated by correlating the received signal with the spreading code of the desired user. These spreading codes are typically generated as pseudo-random sequences using shift registers and are called shift register sequences.

A maximal length shift register sequence is a sequence obtained from a shift register with a certain feedback property. These types of sequences can be described by linear recursion. For example, if $S_t$ is the sequence value ($S_t \epsilon \{0, 1\}$) then:

$$S_t = \sum_{i=1}^{m} S_{t-i} a_i \tag{1}$$

where the sum is performed using modulo-2 addition and the coefficients $a_i \epsilon \{0, 1\}$. The sequences generated by this technique will vary in length. For certain sequences, the length will be $2^m-1$. If this is the case, $s_t$ is said to be a maximal length shift register sequence, which sequences are used as spreading codes. There are two general techniques for conventionally generating such sequences. The first way, referred to as a simple shift register generator (SSRG), is shown in FIG. 1.

In the example of FIG. 1, the sequence is shifted through a plurality of delay stages 10–18. The $s_t$ and $s_{t+2}$ terms are modulo-2 added together at block 20, such that $s_{t+5}=s_t+s_{t+2}$, which implies $s_t=s_{t-3}+s_{t-5}$. If the sequence is started with the shift stages in the all zero state, then the resulting sequence is identically zero. If, on the other hand, the sequence is started in state 00001, the sequence of states is:

| 00001 | 01101 | 00111 | 01110 |
|-------|-------|-------|-------|
| 10000 | 00110 | 00011 | 10111 |
| 01000 | 10011 | 10001 | 01011 |
| 00100 | 11001 | 11000 | 10101 |
| 10010 | 11100 | 01100 | 01010 |
| 01001 | 11110 | 10110 | 00101 |
| 10100 | 11111 | 11011 | 00010 |
| 11010 | 01111 | 11101 | 00001 |

The resulting maximal length sequence is 1000010010110011111000110111010 and has length 31.

Another conventional method used to generate the same sequence is shown in FIG. 2. This technique is sometimes referred to as a modular shift register generator (MSRG). Like the simple shift register generator, the modular shift register generator also has a plurality of shift or delay stages 24–32. However, it can be seen in FIG. 2 that the modulo-2 adder 22 is now inserted between the second 26 and third 28 shift stages. The contents of the shift register of FIG. 2, using the same initial inputs as those given above for the shift register of FIG. 1, are:

| 00001 | 01110 | 00110 | 01101 |
|-------|-------|-------|-------|
| 10100 | 00111 | 00011 | 10010 |
| 01010 | 10111 | 10101 | 01001 |
| 00101 | 11111 | 11110 | 10000 |
| 10110 | 11011 | 01111 | 01000 |
| 01011 | 11001 | 10011 | 00100 |
| 10001 | 11000 | 11101 | 00010 |
| 11100 | 01100 | 11010 | 00001 |

The resulting 31 bit sequence generated is 1001011001111100011011101010000. This sequence is a cyclically shifted version of the sequence generated by the shift register generator of FIG. 1, i.e., an equivalent sequence.

Sometimes it is advantageous to use extended or augmented shift register sequences. For example, in the IS-95 CDMA standard, length $2^{15}-1$ sequences are extended by one zero chip value to obtain sequences of length $2^{15}$. An example of extended sequence generation in conjunction with a modular shift register generator is discussed in U.S. Pat. No. 5,228,054. Also, combinations of PN sequences can be used to form Gold sequences. Extended Gold sequences are also possible.

In portable radiocommunication devices, it is generally desirable to conserve battery power. Accordingly, such devices, e.g., mobile phones, may periodically be put into a sleep mode, for example when turned on but not in use ("idle"), wherein most of the electronics are powered shut down. The phone may be asleep for time intervals on the order of a second, so that sleep intervals correspond to many chip periods. For example, sleep mode can be used to reduce the power consumption of an idle phone, which phone "awakens" only during periods when it can receive a page, e.g. during an assigned paging frame. If a page is not received, the phone can return to the sleep mode, thereby conserving battery power.

When the phone wakes up to, e.g., listen for pages, it is desirable to properly reset the circuitry used for receiving messages. This resetting process includes producing shift register sequences having the correct state. For example, the IS-95 system state is partially determined by two shift register sequences, sometimes referred to as the short and long code sequences. For such systems, in order to properly decode messages transmitted over the paging channel, the phone needs to have the proper short and long code sequences for despreading and descrambling.

Accordingly, there is a need to efficiently advance shift register sequences by a certain number of clock cycles to accommodate, for example, deactivated circuitry during sleep modes. If the sequence is not advanced properly, received signals may not be properly despread resulting in lost pages and power consuming re-synchronization. If the sequence is advanced properly, but at a huge cost in battery power, then the standby time of the phone is greatly reduced. For example, the simplest solution for advancing a sequence generator to a future state is to clock the sequence generator until the desired state new state is reached. The clock to the sequence generator can be left on during sleep mode, so that the generator advances to the desired state when the rest of the phone wakes up. However, such an approach can be costly in battery consumption, as the sequence clock typically operates at a high clock rate and power consumption increases as the clock rate increases. Thus, a power efficient, yet accurate, technique for handling the advancement of shift register sequences after sleep mode is needed.

SUMMARY

According to the present invention, these and other drawbacks, limitations and objects of conventional pseudorandom number sequence generation techniques are overcome by efficiently advancing the shift register from one state to another state, e.g., so that the shift register is in a desired state upon exiting sleep mode. Exemplary embodiments of the present invention provide for selectable linear combinations of elements of the shift register to use the current state to compute the new state based on an arbitrary shift.

A receiver according to an exemplary embodiment of the present invention can include a processor which determines the desired, arbitrary shift and provides this information to a sequence advancing unit. The sequence advancing unit extracts the current state of the sequence generator and selectively combines matrices associated with the current state values using the arbitrary shift information to arrive at the new state. This new state can then be used to overwrite the contents of the shift register so that, for example, when the receiver awakens to investigate messages transmitted on a paging channel, the proper pseudorandom number sequences are available for despreading and descrambling.

BRIEF DESCRIPTION OF THE DRAWINGS

The foregoing, and other, features, objects and advantages of the present invention will become apparent from the detailed description set forth below when read in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits (e.g., transmit and receive filtering) are omitted so as not to obscure the description of the present invention with unnecessary detail.

Figure 3A:
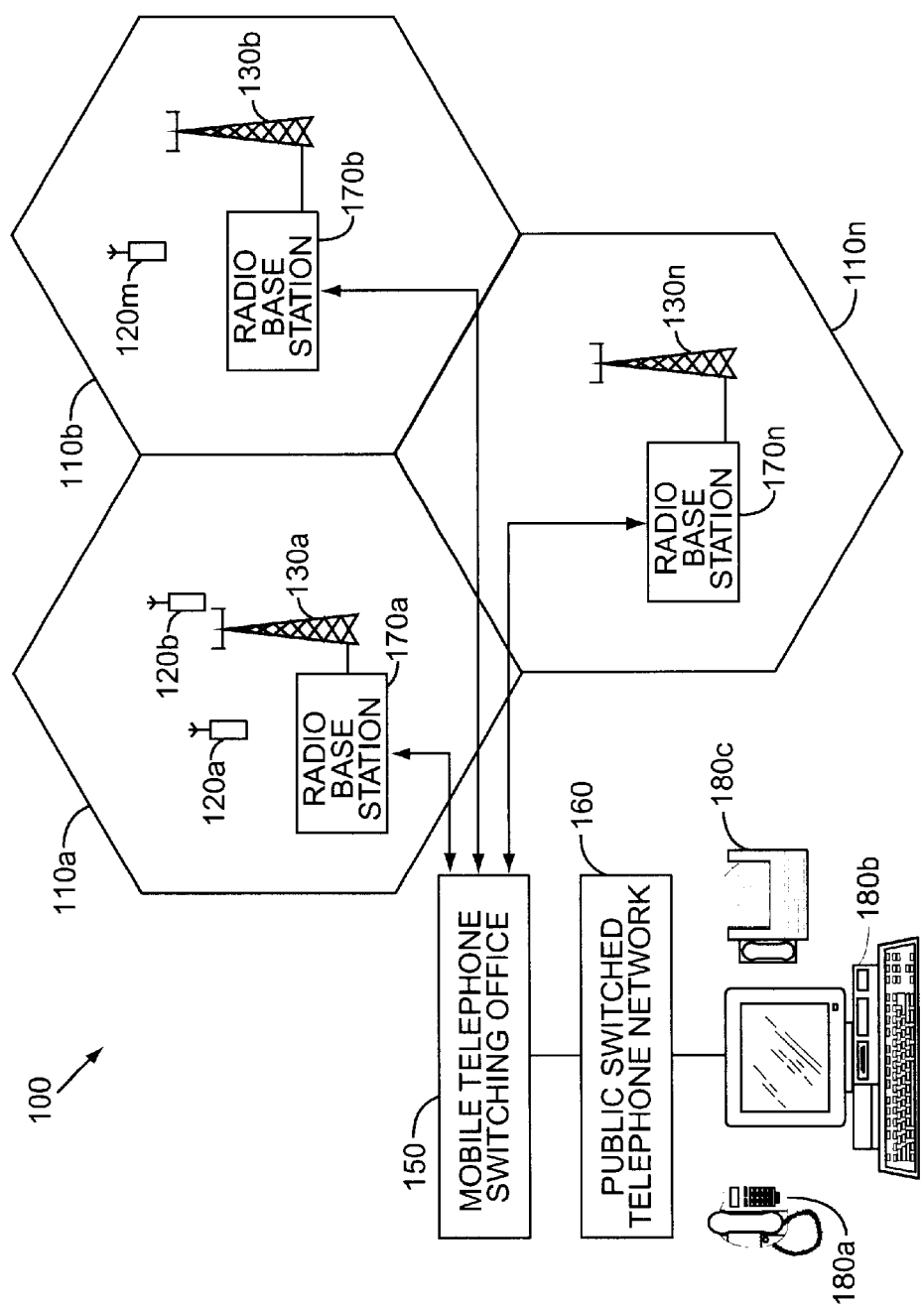
FIG. 3A is a schematic illustration of a cellular radio communications system.

An exemplary cellular radio communication system 100 is illustrated in FIG. 3A. As shown therein, a geographic region served by the system is subdivided into a number, n, of smaller regions of radio coverage known as cells 110*a–n*, each cell having associated with it a respective radio base station 170*a–n*. Each radio base station 170*a–n* has associated with it a plurality of transmit and receive radio antennas 130*a–n*. Note that the use of hexagonal-shaped cells 110*a–n* is employed as a graphically convenient way of illustrating areas of radio coverage associated with a particular base station 170*a–n*. In actuality, cells 110*a–n* may be irregularly shaped, overlapping, and not necessarily contiguous. Each cell 110*a–n* may be further subdivided into sectors according to known methods. Distributed within cells 110*a–n* are a plurality, m, of mobile stations 120*a–m*. In practical systems the number, m, of mobile stations is much greater than the number, n, of cells. Base stations 170*a–n* comprise inter alia a plurality of base station transmitters and base station receivers (not shown) which provide two-way radio communication with mobile stations 120*a–m* located within their respective calls. As illustrated in FIG. 3A, base stations 170*a–n* are coupled to the mobile telephone switching office (MTSO) 150 which provides inter alia a connection to the public switched telephone network (PSTN) 160 and henceforth to communication devices 180*a–c*. The cellular concept is known to those skilled in the art and, therefore, is not further described here.

Figure 3B:
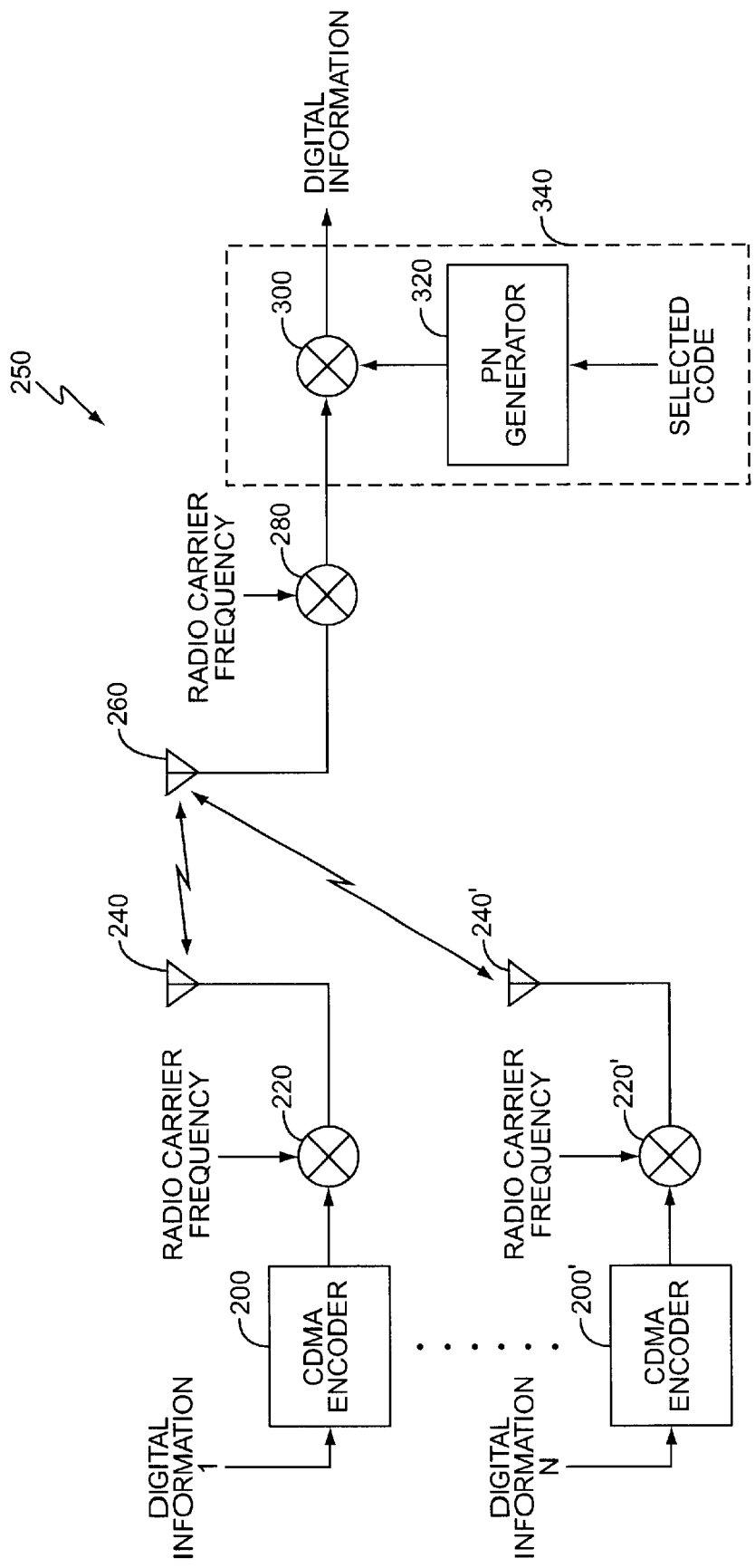
FIG. 3B is a general block diagram of a CDMA transmitter and receiver.

As mentioned above, radio communications between the base stations and the mobile stations can be implemented using direct sequence code division multiple access (DS-CDMA). FIG. 3B generally illustrates this concept. Digital information 1 to be transmitted over an RF communications channel is coded in a CDMA encoder 200. The coded signal is used to modulate an RF carrier in a mixer 220. The modulated carrier is transmitted over an air interface via a transmitting antenna 240. Other digital information from other transmitters, e.g., 2 . . . N, may be transmitted in a similar fashion. A receiving antenna 260 of a receiver 250 receives a composite, RF signal and demodulates the composite signal using another mixer 280. The desired signal is extracted from the composite signal by correlation with the code assigned to that receiver for this particular connection at block 300. This code is generated using a pseudorandom number (PN) generator 320 which is part of decoder 340.

The state of the pseudorandom number generator 320 may need to be advanced under certain circumstances, e.g., just before or just after sleep mode. State advancement may be performed in stages, in which each stage may provide differing amounts of advancement. Each stage can be performed by any of the methods according to the present invention that are described below as well as by simply clocking the shift register.

As mentioned earlier, one solution to the problem of providing the correct system state upon exiting sleep mode is to keep clocking the sequence generator while the rest of the circuitry is asleep, with the drawback that power consumption is high. Some power savings can be achieved when the length of the sleep mode period includes one or more periods of the shift register sequence. Then, the sequence need only be advanced by the remainder of dividing the sleep period by the sequence period. For the remaining time, the sequence clock can be turned off. Sleep mode periods are typically a set of fixed values, so that the amount of clocking needed can be pre-computed and stored in a table.

These approaches can be accelerated by using a sequence clock that runs at a rate much higher than the sequence chip rate. For example, if there is a sequence clock having a rate eight times the chip rate, then the sequences can be advanced in ⅛ of the time normally required, so that the sequence generators can be in sleep mode for the remaining ⅞ of the time.

Other exemplary embodiments solve this problem by considering how to determine a shift of a particular shift register sequence. Consider the shift register sequence of length 31 generated from FIG. 1. If the group of 31 different sequences obtained by starting in the 31 different nonzero states and the all zero sequence are considered, the result is a linear code with 32 codewords or sequences of length 31. Linearity follows by the fact that adding two different sequences gives a third sequence. As a result, the set of 32 sequences has at most five linearly independent sequences (also referred to herein as "basis sequences"). These independent sequences can be any five of the nonzero sequences. From the five basis sequences, any of the other 32 sequences can be obtained by linear combination. For the above example the five sequences shown below can be selected as basis sequences.

g1=1000010010110011111000110111010
g2=0000100101100111110001101110101
g3=0001001011001111100011011101010
g4=0010010110011111000110111010100
g5=0100101100111110001101110101000

Figure 3C:
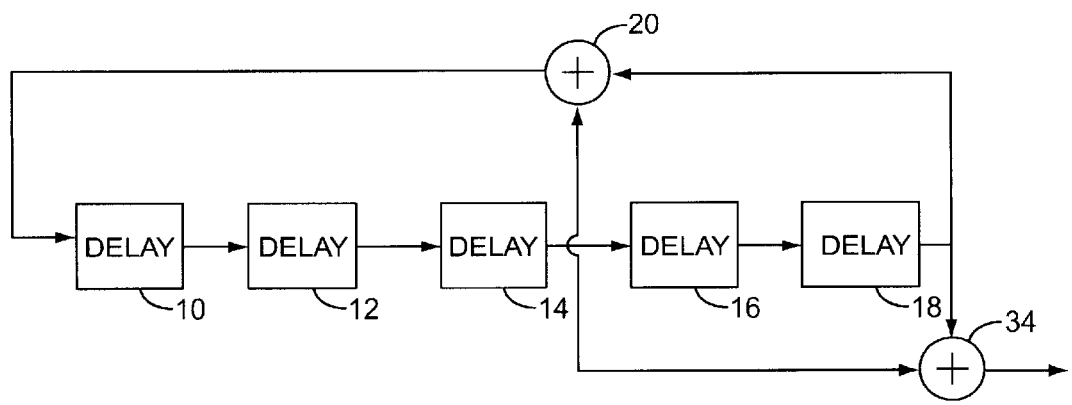
FIG. 3C illustrates combining shift register contents to provide an advanced element value.

The first sequence is the output of the last stage of the shift register, the second sequence is the output of the second to last stage, etc. As an example the sequence 1001011001111100011011101010000 can be obtained by modulo-2 adding the first and third sequences. Thus the circuit of FIG. 1 can be modified by providing an additional modulo-2 adder 34 as shown in FIG. 3C to obtain a version of the original sequence which is cyclically shifted ahead by five clock cycles. Accordingly, it will be understood that any shifted version of the sequence may be obtained by modulo-2 adding different stages of the shift register.

One approach for generating a shifted sequence that is based on this property is given in U.S. Pat. No. 5,228,054. A modular shift register generator is used, with additional circuitry to extend the sequence by one chip. A shifted sequence is obtained by a linear combination of the state values. The particular shift obtained is determined by which state values are combined, which is determined by a mask. To solve the problem of properly advancing the sequence generation after each sleep mode would require continual recalculation of the mask. One way to avoid this problem is to allow the contents or state of the generator to be replaced with a new state.

Consider the problem of determining the contents of the shift register some fixed number of clock cycles in the future. For example, to find the state 10 clock cycles in the future and load the shift register with the new contents in one clock cycle, the following approach can be used.

First, represent the contents of the shift register at time t by a vector $x(t)=(x_1(t), x_2(t), \ldots x_m(t))'$, where $x_1(t)$ represents the contents of the register on the left and $x_m(t)$ represents the contents of the register on the right. Then there is a linear transformation that determines the relationship between $x(t)$ and $x^m-1$)

$$x(t)=Mx(t-1)$$

Thus $$x(t+1)=M^1x(t)$$

Thus the transformation of the state at time t to time t+1 can be accomplished using matrix multiplication.

For the example above with the simple shift register implementation the matrix is:

$$M_s = \begin{bmatrix} 0 & 0 & 1 & 0 & 1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{bmatrix}$$

For the modular implementation the matrix is:

$$M_m = \begin{bmatrix} 0 & 0 & 0 & 0 & 1 \\ 1 & 0 & 0 & 0 & 0 \\ 0 & 1 & 0 & 0 & 1 \\ 0 & 0 & 1 & 0 & 0 \\ 0 & 0 & 0 & 1 & 0 \end{bmatrix}$$

Thus, to determine the state 10 time units in the future we would use the 10th power of the matrix which can be pre-computed and stored or realized in combinatorial logic. For the simple shift register implementation this is:

$$M_s^{10} = \begin{bmatrix} 1 & 1 & 1 & 0 & 1 \\ 1 & 1 & 1 & 0 & 0 \\ 0 & 1 & 1 & 1 & 0 \\ 0 & 0 & 1 & 1 & 1 \\ 1 & 0 & 1 & 0 & 1 \end{bmatrix} \text{ and thus}$$

$$x(t+10) = \begin{bmatrix} 1 & 1 & 1 & 0 & 1 \\ 1 & 1 & 1 & 0 & 0 \\ 0 & 0 & 1 & 1 & 1 \\ 1 & 0 & 0 & 0 & 1 \end{bmatrix} x(t)$$

Since the sequence has period 31, $M^{31}$ is the identity matrix. Because of the linearity there is a mapping between the state of the modular shift register and the simple shift register for the same bit in the output sequence. Let y(t) be the sequence. Then at time t the simple shift register will be in state $x_s(t)$ while the modular shift register will be in state $x_m(t)$. The last element of each register must be identical since the output is identical and the last element is the output. In general:

$$x_s(t)=G * x_m(t)$$

$$x_m(t)=H * x_s(t)$$

where G and H are binary matrices and $G=H^{-1}$. H can be found as follows. First observe that the modular shift register goes through the following m states:

```
01001
10000
01000
00100
00010
00001
```

The corresponding output is 100001. The simple shift register has the corresponding states:

```
00101
10000
01000
00100
10010
01001
```

Thus the columns of matrix G are the states of the simple shift register corresponding to the state of the modular shift register when the modular shift register contains a single one. In this example the matrix H is:

$$H = \begin{bmatrix} 1 & 0 & 0 & 1 & 0 \\ 0 & 1 & 0 & 0 & 1 \\ 0 & 0 & 1 & 0 & 0 \\ 0 & 0 & 0 & 1 & 0 \\ 0 & 0 & 0 & 0 & 1 \end{bmatrix} \text{ and}$$

$$G = \begin{bmatrix} 1 & 0 & 0 & 1 & 0 \\ 0 & 1 & 0 & 0 & 1 \\ 0 & 0 & 1 & 0 & 0 \\ 0 & 0 & 0 & 1 & 0 \\ 0 & 0 & 0 & 0 & 1 \end{bmatrix}$$

Figure 1:
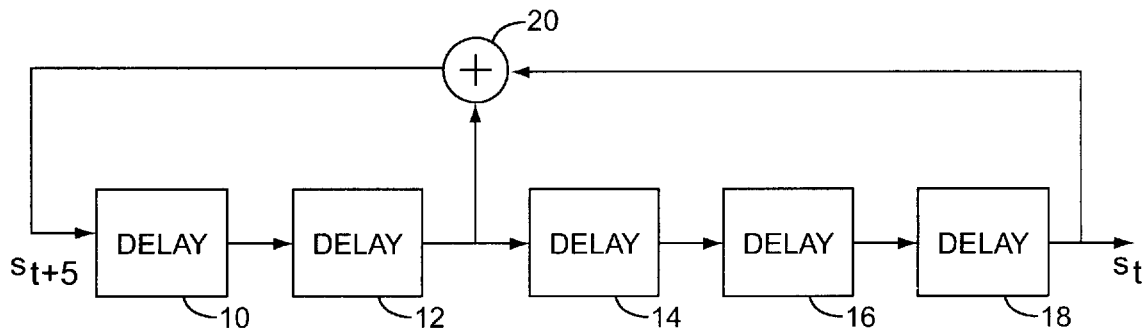
FIG. 1 illustrates a simple shift register generator.
Figure 2:
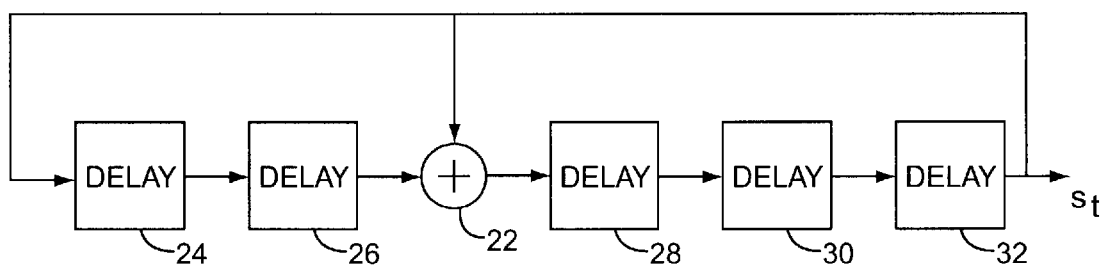
FIG. 2 illustrates a modular shift register generator.

Using the above theory, an implementation of the state transition diagram can be developed by taking the current state and applying the linear combination determined from the matrix M to determine the state in the future. An exemplary embodiment of the present invention using a 31-chip sequence to determine the sequence state ten steps in the future is given in FIG. 4. Therein, the five shift stages are again denoted with reference numerals 10–18 and modulo-2 adder 20 is provided as illustrated in FIGS. 1 and 3C. However, the outputs of each of the shift stages are selectively modulo-2 added together in order to provide the necessary linear combination to arrive at a sequenced state ten steps ahead. For example, modulo-2 adder 40 adds the outputs of shifts stages 10, 12, 14 and 18 to arrive at the output of shift stage 10 ten steps in the future. Modulo-2 adder 42 adds the outputs of shift stages 10, 12 and 14 to arrive at an output for shift stage 12 advanced ten steps ahead. Modulo-2 adder 44 combines the outputs of shift stage 12, shift stage 14 and shift stage 16 to produce an output for shift stage 14 that is also ten steps advanced. Likewise, modulo-2 adder 46 combines the outputs of shift stage 14, shift stage 16 and shift stage 18 to produce its advanced output for shift stage 16. Lastly, modulo-2 adder 48 adds the outputs of shift stage 10 and shift stage 18 to provide a ten step advanced version of the output of shift stage 18.

Figure 4:
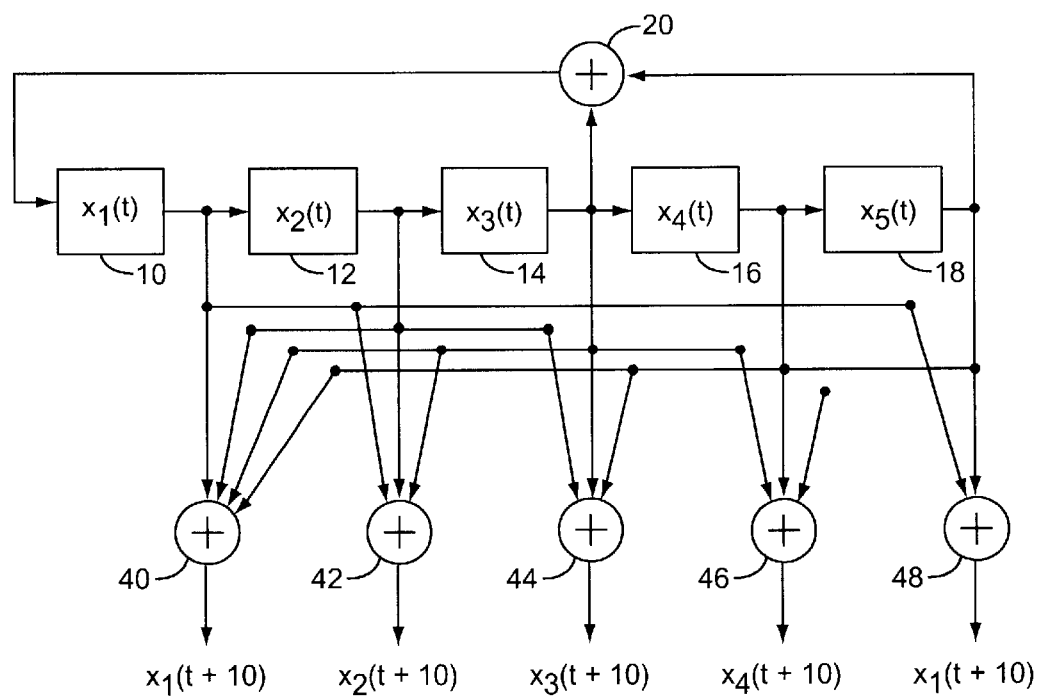
FIG. 4 illustrates an exemplary circuit according to the present invention for advancing the state of a sequence generator by ten steps.
Figure 5:
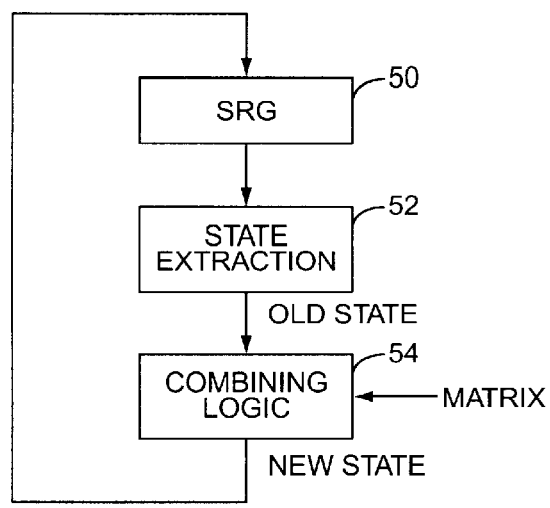
FIG. 5 is a generalized version of the exemplary embodiment of FIG. 4.

A general structure for providing advanced sequences is shown in FIG. 5. The current state is held in a shift register generator (SRG) 50, which may be a simple shift register generator, a modular shift register generator, or an extended version thereof. The current state is extracted at block 52 to output an "old" state to combining logic 54, e.g., the modulo-2 adders 40–48 in FIG. 4. Combining logic 54 is used to determine the new state from the old one, based on an input matrix. Then, this new state is used to overwrite the state of the SRG 50. Overwriting can be performed in parallel or in series. For example, the shift register logic could be inhibited so that the new state can be shifted into the memory elements of the SRG 50.

If only one shift or multiples of it are needed, then the matrix is fixed and the corresponding combining logic can be used without the need for a matrix input, as shown in FIG. 4. The example in FIG. 4 provides a fixed shift of ten steps. However, circuitry for a shift having an arbitrary number of steps may also be beneficial, e.g., to compensate for awaking after different duration sleep periods. In order to calculate an arbitrary shift, an arbitrary power of M needs to be computed. If N is the length of the shift register sequence, e.g., N=31, any power of M up to 30 can be computed by multiplying some of the following:

$$M \; M^2 \; M^4 \; M^8 \; M^{16}$$

For example, to obtain $M^{10}$, $M^{8}* \; M^2$ is calculated. If a particular shift of the nominal sequence is currently being used and an additional shift is desired, then multiplying the current M by another power of M will provide a new shift. This can be accomplished using mod-N arithmetic of the two shifts to obtain a new binary representation of the desired shift.

Figure 6:
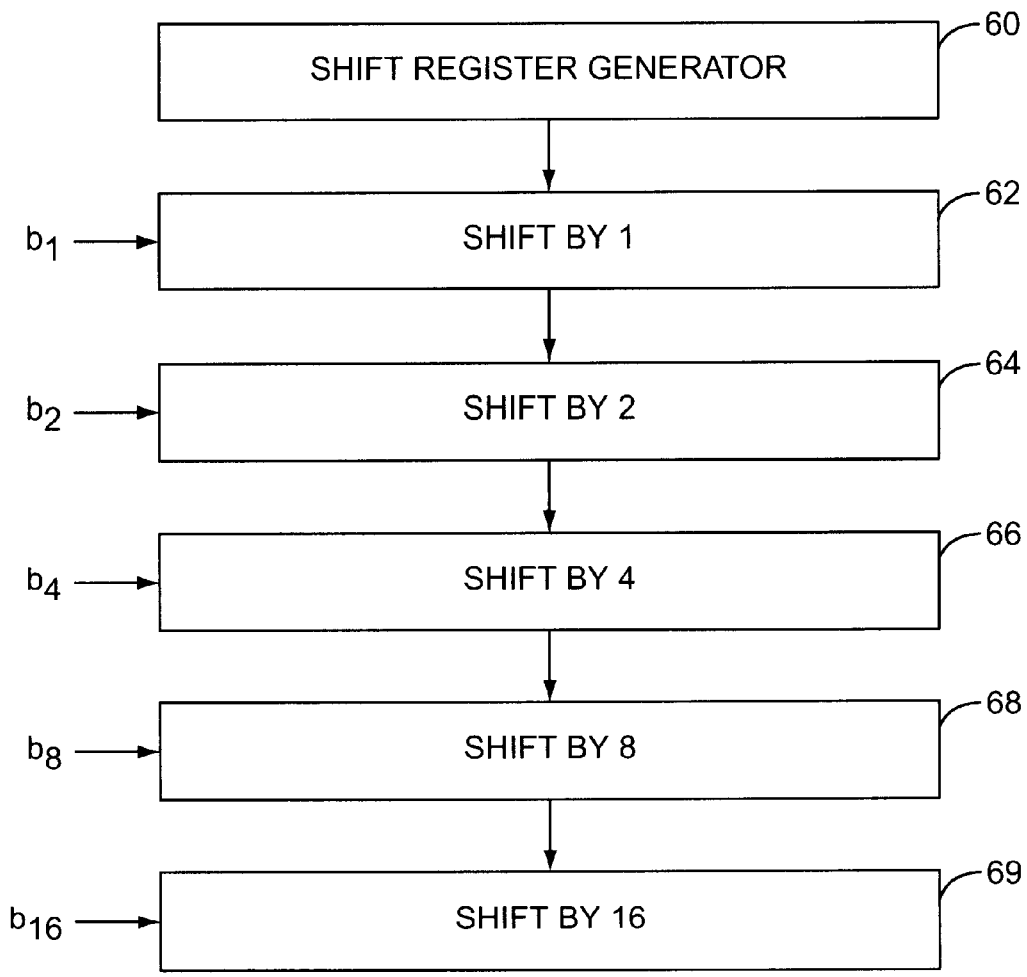
FIG. 6 is a block diagram of circuitry for advancing a shift register by an arbitrary number of steps.

To obtain different shifts requires different connections in the combining logic. An arbitrary shift can be obtained by having five different shifting operations that are either gated on or off as shown in FIG. 6. Therein, shift register generator 60 holds the current or "old" sequence state. The first circuit 62 forms a shift of this sequence by one clock cycle. The second circuit 64 takes the output of circuit 62 and shifts it by two clock cycles. The third circuit 66 shifts the output of circuit 64 by four clock cycles. The fourth circuit 68 shifts the output of circuit 66 by 8 clock cycles and the last stage 69 shifts the output of circuit 68 by 16 cycles. By selectively gating each of these circuits, i.e., to either include their contribution or not, an arbitrary shift is obtained.

In FIG. 6 the lines labeled $b_1, b_2, \ldots b_{16}$ are the bits in the binary representation of the desired shift. At each block 62–69 the input is either multiplied by $M^j$ or not multiplied depending on whether the corresponding gating bit b is 1 or zero, respectively. For example, to shift the current sequence contained in SRG 60 by 13 steps into the future, bits $b_1$–$b_{16}$ would be set as follows:

$$b_1=1, \; b_2=0, \; b_4=1, \; b_8=1, \; b_{16}=0.$$

For simple shift register implementations of the present invention, shifting can also be performed serially as follows. For the simple shift register generator (SSRG) implementation the state can be easily be determined from the sequence. The last m sequence outputs comprise the state m time units in the past. If the sequence output is determined at time t, t+1, ..., t+m−1, then the state at time t is just those outputs. Thus the state a time units in the future can be sequentially determined by calculating the sequence from time t up to t+m−1. An additional storage register is needed in this implementation so that the sequence from time t to time t+m−1 can be completely determined before the contents of the SRG are overwritten.

The circuitry used to serially determine the sequence at future time t+a is a subset of the circuitry needed to determine the state at time t+a. For example, let $m_1^{(a)}$ be the first row in the matrix $M^{a.}$ So the sequence at time t+a is:

$$x_m(t+a) = m_1^{(a)} x(t)$$

As an example:

$$m_1^{(1)} = [00010]$$

so that to obtain the sequence one time unit in the future the second to last element of the shift register is tapped. Thus:

$$m_1^{(2)} = [00100]$$
$$m_1^{(3)} = [01000]$$
$$m_1^{(4)} = [10000]$$
$$m_1^{(5)} = [00101]$$
$$m_1^{(6)} = [01010]$$
$$m_1^{(7)} = [10100]$$
$$m_1^{(8)} = [01101]$$
$$m_1^{(9)} = [11010]$$
$$m_1^{(10)} = [10001]$$

Figure 7:
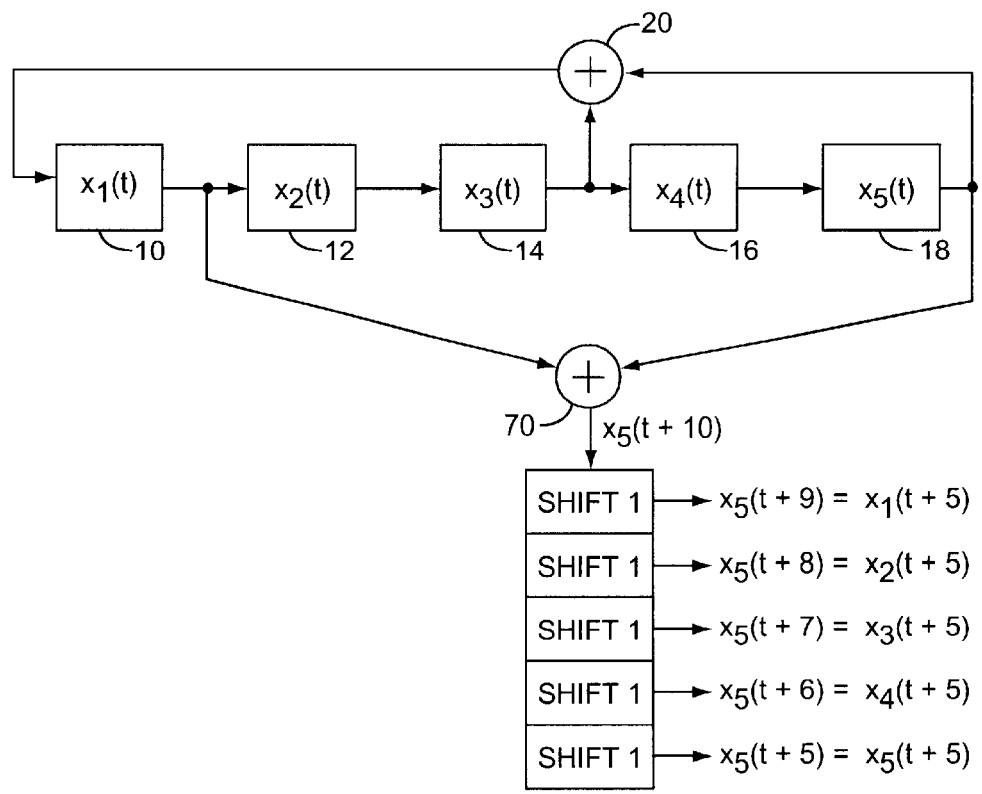
FIG. 7 is another exemplary embodiment of the present invention where state advancement is performed serially.

An example for determining the sequence state five steps in the future using the aforedescribed serial approach is illustrated in FIG. 7. Therein, the shift stages 10–18 and modulo-2 adder 20 operate as described above with respect to FIGS. 1 and 3C. A modulo-2 adder 70 is provided which adds the outputs of shift stages 10 and 18 to provide an output of shift stage 18 which is advanced ten steps into the future. The shift register is then clocked five times to provide versions of the output of stage 18 each of which can be used to represent versions of other stages at time t+5.

Figure 8:
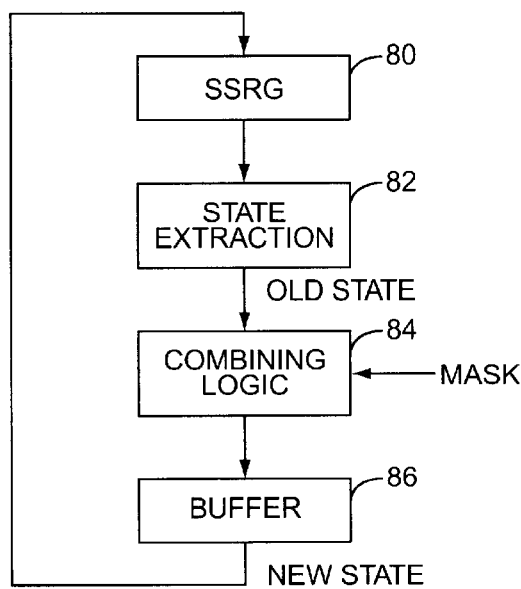
FIG. 8 is a generalized diagram of the example of FIG. 7.

A generalized structure for this serial approach is given in FIG. 8. An SSRG 80, which may include circuitry for extended sequence generation, is used for sequence generation. The state of the sequence generator 80 is extracted by the state extraction unit 82. The state values are then combined according to a mask in the combiner 84. For example, the mask for the example in FIG. 7 is 10001, indicating that $x_1(t)$ and $x_5(t)$ should be modulo-2 added. Combiner outputs from several iterations are stored in a buffer 86. When the buffer 86 is full, the buffer results are used to overwrite the contents of the SSRG 80.

Figure 9:
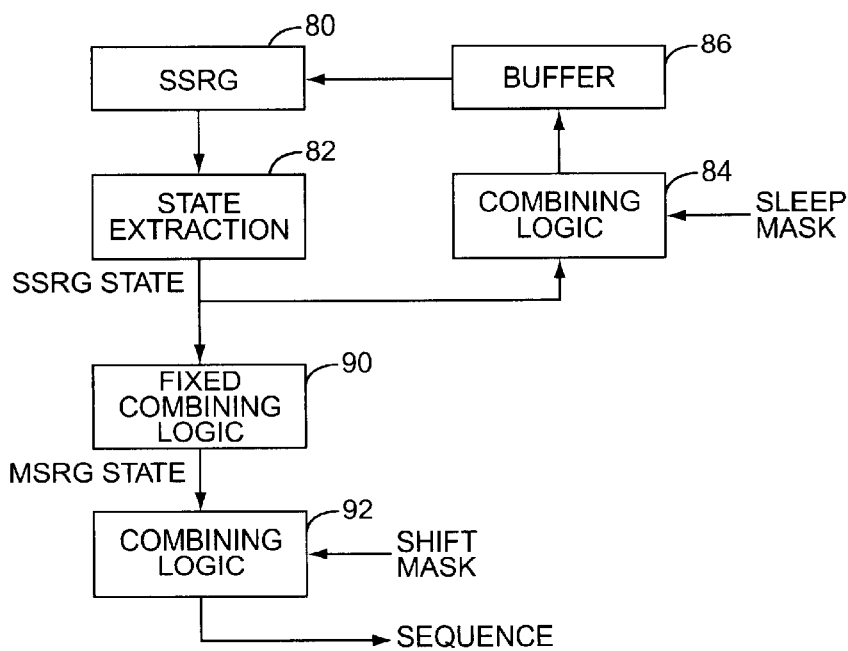
FIG. 9 illustrates another exemplary embodiment of the present invention which handles adjustments of the state of a shift register for sleep mode and generation of a shifted sequence.

Such an approach may be used for situations wherein sequence advancement is desirable other than sleep mode. For example, IS-95 channels are assigned different shifts of a shift register sequence of length $2^{42}-1$. These shifts are typically specified by a mask applied to the state of an MSRG. The circuit in FIG. 8 can be used to sequentially convert an SSRG state to an MSRG state for subsequent masking. The circuit of FIG. 8 can be modified to include both shifting a sequence and handling sleep mode operation, as illustrated in FIG. 9. Therein, elements 80–86 operate as described above with respect to FIG. 8. Fixed combining logic 90 transforms the SSRG state into an equivalent MSRG state using the relationships described above. Then, the shifted sequence is determined by combining the MSRG state using the shift mask.

Other alternatives to this are also possible. One approach is to use an MSRG and determine the state in the future using a matrix multiply over {0,1}, where the matrix depends on the amount of time in the future desired. Another approach is to use an SSRG but apply the matrix operation to the mask. This complicates mask generation, but simplifies the circuit in FIG. 9 by removing the fixed combining logic.

In practice, these methods can be used in various combinations. For example, one could pre-compute $M^j$ for a set of standard jumps j. Performing a series of multiplications by various standard matrices would advance the state to something close to the desired jump. The remaining advancement could be achieved by other means, such as simply clocking the sequence generator.

There are other sequences, such as Gold sequences, which are combinations of two or more shift register sequences. The present invention can be used to determine the state in the future by determining the state of each shift register separately.

The preceding description of the preferred embodiments are provided to enable any person skilled in the art to make and use the present invention. Various modifications to these embodiments will be readily apparent to those skilled in the art, and the principles described herein may be applied without departing from the scope and spirit of the present invention. Thus, the present invention is not limited to the disclosed embodiments, but is to be accorded the widest scope consistent with the claims below.

What is claimed is:

1. A receiver comprising:

a sequence generator for generating a pseudorandom number sequence based on an operating state, said pseudorandom number used in processing received signals;

a processor for generating control information indicating a sleep interval for said receiver;

means for extracting the current operating state of the sequence generator;

combinatorial logic means for combining elements of said extracted state to form said new operating state using said control information;

means for determining said new operating state further includes clocking the sequence generator at a rate higher than the chip rate; and means for replacing the current operating state of said sequence generator with said new state.

2. The receiver of claim 1, wherein said sequence generator generates a maximal length shift register sequence.

3. The receiver of claim 1, wherein said sequence generator generates an extended maximal length shift register sequence.

4. The receiver of claim 1, wherein said sequence generator generates an extended Gold sequence.

5. The receiver of claim 1, wherein said combinatorial logic means further comprises:

memory means for storing combining information that corresponds to pre-determined sleep intervals;

means for extracting particular combining information from said memory means in response to said control information; and means for applying said combining information to selectively combine elements of said extracted current operating state using combinatorial logic to determine said new operating state.

6. The receiver of claim 1, wherein said means for extracting the current operating state further comprises:

means for reading memory elements in said sequence generator in parallel.

7. The receiver of claim 1, wherein said means for extracting the current operating state further comprises:

means for reading memory elements in said sequence generator serially.

8. The receiver of claim 1, wherein said means for determining said state further comprises:

logic which maps the state corresponding to one shift sequence generator to an equivalent state of another shift sequence generator.

9. The receiver of claim 1, wherein said processor generates control information by determining the remainder of dividing the sleep interval by the sequence period.

10. A receiver comprising:

a simple shift register generator (SSRG);

means for extracting the state values of said SSRG;

means for combining said state values to form a state corresponding to a modular shift register generator (MSRG); and means for combining state values of said MSRG state to form a sequence.

11. The receiver of claim 10, further comprising:

means for combining said state values of said SSRG state to form a shifted sequence;

memory means for storing elements of said shifted sequence; and means for overwriting the state of said SSRG with the contents of said memory means.

12. A method for advancing a current state of a sequence generator comprising the steps of:

providing a desired amount of advancement;

extracting a current state of said sequence generator;

combining values from said current state based upon said desired amount of advancement to generate a new state; and overwriting said current state with said new state.

13. A receiver comprising:

a sequence generator for generating, at a sequence chip rate, a pseudorandom number sequence based on an operating state, said pseudorandom number used in processing received signals;

a processor for generating control information indicating a sleep interval for said receiver;

means for extracting the current operating state of the sequence generator;

means for determining a new operating state by clocking the sequence generator at a rate higher than the chip rate based on said control information; and means for replacing the current operating state of said sequence generator with said new state.

* * * * *